Patented Sept. 18, 1951

2,568,341

UNITED STATES PATENT OFFICE 2,568,341

PRODUCTION OF POTASSIUM TITANIUM FLUORIDE

Henry C. Kawecki, Fleetwood, and Edwin J. Bielecki, Muhlenburg Township, Berks County, Pa., assignors to The Beryllium Corporation, Reading, Pa., a corporation of Delaware No Drawing. Application February 3, 1951,
Serial No. 209,318

8 Claims. (Cl. 23—88)

This invention relates to the production of sodium, potassium and ammonium fluotitanates and contemplates a novel process for the production of these fluotitanates in a state of high purity from iron-bearing titaniferous raw materials.

Potassium fluotitanate [$K_2TiF_6$], known also as potassium titanium fluoride, is being used extensively as an addition agent for baths of molten aluminum. The titanium content of this salt is replaced by the aluminum with the result that the liberated titanium goes into solution in the molten aluminum wherein it functions as a grain refining agent. The particular effectiveness of the potassium salt has led to increasing interest in the corresponding sodium and ammonium salts both for this and for other equally effective but wholly unrelated uses.

In the United States patent to Kawecki No. 2,475,287, there is described and claimed a method of producing potassium fluotitanate from an iron-bearing titaniferous material such as ilmenite. The method of the patent comprises digesting the titaniferous material with sulfuric acid to form a titanium sulfate-containing plastic mass, extracting the titanium sulfate therefrom with an aqueous medium, treating the extract with calcium fluoride to form titanium fluoride, treating the resulting solution of titanium fluoride after its separation from the insolubles with an ionizable fluorine compound in the presence of potassium chloride, and separating crystals of potassium fluotitanate from the resulting solution. The sulfuric acid used in the digestion stage not only attacks the titanium component of the ore but also converts the iron content thereof to iron sulfate. Inasmuch as all ferric ions must be reduced to the ferrous state prior to the addition of potassium chloride to the titanium-iron solution, it will be understood that the iron component of the ore is carried through to the final stage of the process and appears in the latter in the form of ferrous sulfate. Inasmuch as ferrous sulfate has a relatively low degree of solubility, and the separation of insoluble ferrous sulfate must be avoided during the crystallization of the potassium fluotitanate, it will be appreciated that the presence of ferrous sulfate sets an arbitrary limit on the concentration of potassium fluotitanate in the solution from which the salt is crystallized. As a result, crystallization of the fluotitanate is not only retarded but is impaired to the extent that the salt tends to crystallize in the form of very fine and difficultly separable crystals.

We have now found that the aforementioned deleterious effect of iron carried through the process from the raw material to the final step of crystallizing the fluotitanate can be avoided by so carrying out the early stages of the process that the iron will be present in the fluotitanate solution in the form of a more highly soluble ferrous salt. Thus the method of our present invention, which is applicable to the production of sodium, potassium and ammonium fluotitanates, comprises digesting an iron-bearing titaniferous material with sufficient hydrofluoric acid in an aqueous medium to form a titanium fluoride- and iron fluoride-bearing solution, separating the resulting solution from the insolubles, adding to the separated solution at a temperature of at least about 70° C. and in the presence of free hydrofluoric acid, advantageously carried over from the digestion stage, a salt of the alkali whose fluotitanate it is desired to produce, said alkali salt having an anion which will form a ferrous salt more soluble than ferrous sulfate in the somewhat acidic reaction medium, and subsequently cooling the resulting solution to effect crystallization of the desired fluotitanate therefrom. A further feature of our invention resides in the discovery of the advantages which result in the crystallization stage by the introduction of sulfuric acid into the reaction mass at any stage prior thereto.

The practice of the method of our invention will be more fully understood from the following discussion which, simply for convenience, will be directed to the production of potassium fluotitanate. It must be understood, however, that our method, except for a minor modification which will be discussed hereinafter, is equally applicable to the production of sodium fluotitanate [$Na_2TiF_6$] and ammonium fluotitanate [$(NH_4)_2TiF_6$].

The method of our invention is adapted to produce the fluotitanate from any titaniferous raw material which is characterized by the presence of significant quantities of elements other than titanium. Thus, our method is applicable to the treatment of titaniferous materials such as titaniferous ores, or concentrates produced therefrom, as distinguished from such predominantly titaniferous materials as native rutile, titanium dioxide, or other single titanium compound. The titaniferous ores, and their concentrates, are generally characterized by significant quantities of iron, and it is for the production of fluotitanates from such iron-bearing titaniferous materials that the method of our present invention was conceived. These iron-bearing titaniferous materials may comprise any of the numerous ilmenite ores or a concentrate prepared therefrom such, for example, as the titanium slag concentrate described in the United States patent to Peirce et al. No. 2,476,453. The aforementioned slag concentrate, which may contain from 2 to 20% iron oxide calculated as Fe, is a particularly suitable starting material for use in the practice of our invention.

The hydrofluoric acid used for digestion of the iron-bearing titaniferous material in accordance with our invention may advantageously be of the commercial grade which comprises about 60% HF. More dilute hydrofluoric acid may be used, as will appear from the specific examples herein, but the use of the 60% commercial grade is recommended because of its ready availability and relative ease of handling. The amount of hydrofluoric acid used in the digestion stage should be in excess of that stoichiometrically required to convert the titanium and iron components of the titaniferous material to titanium tetrafluoride and ferrous fluoride, the excess or free hydrofluoric acid remaining in the digestion solution being used as a source of further fluorine for the conversion of the titanium tetrafluoride to potassium fluotitanate [$K_2TiF_6$]. In general, a sufficient excess of hydrofluoric acid is available for this purpose if the amount of hydrofluoric acid used in the digestion stage is at least 10%, and generally 10 to 20%, in excess of that required stoichiometrically to effect dissolution of the titanium and iron components of the titaniferous material. Of course, if the amount of hydrofluoric acid used for digestion of the titaniferous material is insufficient to provide an excess of the acid after digestion, the required further amount of hydrofluoric acid for the fluotitanate-forming stage may be added immediately therebefore. We have found it advantageous, however, to introduce the full required amount of hydrofluoric acid in the digestion stage inasmuch as the resulting excess of acid, with respect to the digestion stage, insures substantially complete digestion and dissolution of the titanium content of the titaniferous raw material.

The digestion of the titaniferous material with hydrofluoric acid takes place readily with the evolution of a considerable amount of heat. In fact, the heat of reaction is so great as to cause violent boiling and eruption if the reacting quantities of titaniferous material and hydrofluoric acid are brought into contact en masse. Accordingly, we have found it advisable to dilute the hydrofluoric acid of commercial concentration (60% HF) with an approximately equal volume of water and then slowly add the titaniferous material to the hydrofluoric acid solution at a rate such as to prevent undesirable violence of reaction while maintaining effective agitation of the reaction mass. Even when the titaniferous material is added at a low rate, the heat of reaction is sufficient to bring the reaction mass up to a boiling temperature so as to make it desirable to add extraneous cold water to the reacting mass as a temperature controlling expedient. Digestion is complete, for the purpose of the method of our invention, when, after all of the titaniferous material has been added, the temperature of the mass does not further rise and active boiling ceases. It should be noted in passing that the digestion mass resembles a thin slurry and is more readily and easily handled than the plastic digestion mass obtained in practicing the method of the aforementioned Kawecki patent.

At the end of the digestion stage, ferric ions present in the reaction mass must be reduced to the ferrous state in order to prevent the precipitation, during the formation of potassium fluotitanate, of the comparatively insoluble potassium ferric fluoride ($K_3FeF_6$). Reduction of the ferric ions to ferrous ions may be effected in the conventional manner by adding scrap iron, advantageously in the form of foundry iron dust, in amount sufficient to insure the substantial absence in the resulting solution of any significant amount of ferric ions and while preferably maintaining effective agitation of the reaction mass.

Following reduction of the ferric ions, the reaction mass will consist essentially of an aqueous phase comprising a solution of titanium tetrafluoride, ferrous fluoride and hydrofluoric acid and insolubles comprising in general the various gangue constituents present in the titaniferous raw material. The solution is separated from the insolubles by settling or filtration or by a combination of these procedures. The insolubles which are thus separated from the filtrate are advantageously washed with water in order to recover the remainder of the fluoride solution entrained therein.

The titanium tetrafluoride-containing solution, with which the aforementioned wash water is further combined, is then heated if necessary in order to bring it to a temperature of at least about 70° C. We have found that the solution should be at least this hot in order to produce satisfactory yields of the fluotitanate. The potassium component for the fluotitanate is introduced into the constantly agitated solution in the form of the solid salt or as an aqueous solution thereof. The potassium salt, or the sodium or ammonium salt in the corresponding production of these other fluotitanates, should contain for the practice of our invention an anion which will form a ferrous salt more soluble than ferrous sulfate. We have found that the chlorides and nitrates not only meet this solubility requirement, the corresponding ferrous salts having solubilities at least twice that of ferrous sulfate, but are further readily available in commercial quantities at economical prices. It must be understood that with changing market conditions other alkali salts may be used with advantage provided that they have the requisite greater solubility than ferrous sulfate.

The amount of the potassium salt so added in practicing our invention should be at least enough to combine with the titanium tetrafluoride content of the solution and thereby produce potassium fluotitanate. We have found it to be advantageous to use a slight excess of the potassium salt, generally about 2 to 10% in excess of that required stoichiometrically to form $K_2TiF_6$. This excess of potassium salt is far less than that required for control of the solubility of the potassium fluotitanate in the method of the aforementioned patent wherein, because of the presence of ferrous sulfate, less concentrated solutions of the potassium fluotitanate could be produced. Upon dissolution of the potassium salt in the method of our present invention, the resulting solution is cooled to ambient temperature, either slowly or rapidly but while continuing the aforementioned agitation, whereupon crystals of the potassium fluotitanate are produced. The crystals may be readily separated by decantation followed by filtering or centrifuging. The crystals are preferably washed with a small amount of cold water or even with a saturated solution of the same potassium salt.

The method of our invention may be illustrated by the following specific example directed to the conversion of ilmenite to potassium fluotitanate. The ilmenite ore contained by analysis about 58% $TiO_2$ and about 38% iron calculated as FeO. About 73 parts of the ore in pulverized form were slowly added to a mechanically agitated solution of 110 parts of 60% hydrofluoric acid dissolved in 100 parts of water, all parts being by weight. The ore was added to the hydrofluoric acid solution at a rate sufficiently low to prevent the development of any more violent reaction conditions than that evidenced by a gentle boiling of the reacting mass. At intervals throughout the addition of the ore small increments of water totaling about 100 parts by weight were added in order to facilitate the aforementioned temperature control. After all of the ore had been added and the temperature of the reaction mass no longer continued to rise, and while continuing the aforementioned agitation, about 15 parts by weight of foundry iron powder were added to the mass to reduce the iron fluoride content thereof from the ferric to the ferrous state. Cool water was sprayed on the surface of the reaction mass during this reduction operation in order to control froth formation. The insolubles were allowed to settle, the aqueous phase was then separated by decantation, the mud of insolubles was washed with an additional 200 parts by weight of water, and the washed mud was permitted to settle again. The wash water was separated from the insolubles by decantation and was combined with the aqueous phase separated from the insolubles in the first decantation step. The combined liquors were then heated to about 70° C., whereupon 80 parts by weight of solid potassium chloride were added while agitating the solution. Upon cooling to ambient temperature, while agitation of the solution was maintained in order to facilitate crystallization, crystals of potassium fluotitanate formed in the solution. These crystals were separated from the mother liquor by filtration, were washed with a small amount of cold water, and were finally dried in conventional drying oven at a temperature of about 100° C.

We have found that the crystals of the fluotitanate, whether the sodium, potassium or ammonium salt, are larger in size and are more readily filterable when the crystallization takes place in the presence of sulfuric acid introduced into the reaction mass at any stage prior to the crystallization step itself. This result has been observed when adding amounts of sulfuric acid ranging from about 5 to about 50% by weight of the hydrofluoric acid used for the digestion operation, the improvement being more perceptible with increasing amounts of sulfuric acid within the aforementioned range. There appears to be no variation in the improvement in crystallization which can be attributed to the choice of stage in the process wherein the sulfuric acid is introduced. However, we have found that the reduction of ferric ions to the ferrous state proceeds more smoothly if some sulfuric acid is present, and for this reason we have found it advantageous to add at least a part if not all of the sulfuric acid to the reaction mass prior to the addition of scrap iron for effecting the aforementioned reduction.

The following specific example is representative of the method of an invention modified by the further use of sulfuric acid. About 73 parts of the finely divided ilmenite used in the previous example were slowly added to 120 parts of 60% hydrofluoric acid diluted with about 100 parts of water, all parts being by weight. An additional 50 parts by weight of water were used during the digestion operation for temperature control. The reduction of ferric ions to ferrous ions was effected immediately following the digestion operation by adding about 13 parts by weight of foundry iron powder and by further adding about 50 parts by weight of water in the form of a fine spray to control frothing. Sulfuric acid was added to the reduced reaction mass in the amount of about 9 parts by weight of $H_2SO_4$. The mass was then allowed to settle, the aqueous phase was separated from the insolubles by decantation, the insolubles were washed with about 200 parts by weight of water, the wash water was removed by further decantation and was then combined with the first-separated aqueous liquor. The combined liquors were heated to about 70° C. whereupon about 80 parts by weight of solid potassium chloride were added while maintaining vigorous agitation as in each of the other aforementioned digestion and reduction stages. A further addition of sulfuric acid, providing an additional 12 parts by weight of $H_2SO_4$, was made before the potassium fluotitanate solution was cooled. Upon cooling to ambient temperature, while maintaining agitation, the potassium fluotitanate separated in the form of heavy and easily separable crystals which were recovered by filtration, washing and drying.

As pointed out hereinbefore, the method of our invention may also be used for the conversion of the iron-bearing titaniferous material to sodium or ammonium fluotitanate. No significant variation from the above-described procedure need be observed in the production of the ammonium fluotitanate, the sole difference being in the use of an ammonium salt in lieu of the potassium salt prior to the crystallization stage. However, when producing sodium fluotitanate, care should be taken to control the amount of hydrofluoric acid used in the digestion stage so that it does not substantially exceed that amount stoichiometrically required to form the fluotitanate. An appreciable excess of hydrofluoric acid beyond this amount tends to precipitate a sodium fluoride complex when the sodium salt is added. With this one precaution duly observed, the method of producing sodium fluotitanate is virtually the same as that described hereinbefore for the production of potassium fluotitanate.

We claim:

1. The method of producing a fluotitanate of the group consisting of sodium, potassium and ammonium fluotitanates which comprises digesting an iron-bearing titaniferous material with sufficient hydrofluoric acid in an aqueous medium to form a titanium fluoride and iron fluoride-bearing solution, effecting reduction of ferric ions present in said solution to ferrous ions, separating the resulting solution from the insolubles, adding to the separated solution at a temperature of at least about 70° C. and in the presence of free hydrofluoric acid an alkali salt of the group consisting of sodium, potassium and ammonium salts whose anions form a ferrous salt more soluble than ferrous sulfate, and cooling the resulting solution to effect crystallization of the fluotitanate therefrom 2. The method according to claim 1 in which the free hydrofluoric acid is present in the heated fluoride-bearing solution in amount sufficient to provide the necessary fluorine for conversion of the titanium tetrafluoride to the fluotitanate upon the addition thereto of said alkali salt.

3. The method according to claim 1 in which sulfuric acid is introduced at any stage therein prior to said crystallization stage, the sulfuric acid being added in amount equal to about 5 to 50% by weight of the hydrofluoric acid used in the digestion stage.

4. The method of producing a fluotitanate of the group consisting of sodium, potassium and ammonium fluotitanates which comprises digesting an iron-bearing titaniferous material with sufficient hydrofluoric acid in an aqueous medium to form a titanium fluoride and iron fluoride-bearing solution further containing free hydrofluoric acid, effecting reduction of ferric ions present in said solution to ferrous ions, separating the resulting solution from the insolubles, adding to the separated solution at a temperature of at least about 70° C. an alkali salt of the group consisting of sodium, potassium and ammonium salts whose anions form a ferrous salt more soluble than ferrous sulfate, and cooling the resulting solution to effect crystallization of the fluotitanate therefrom.

5. The method according to claim 4 in which the hydrofluoric acid is added in amount of about 10 to 20% in excess of the amount stoichiometrically required for conversion of the titanium and iron contents of the titaniferous material to titanium tetrafluoride and iron tetrafluoride.

6. The method according to claim 4 in which sulfuric acid is introduced at any stage therein prior to said crystallization stage, the sulfuric acid being added in amount equal to about 5 to 50% by weight of the hydrofluoric acid used in the digestion stage.

7. The method of producing a fluotitanate of the group consisting of sodium, potassium and ammonium fluotitanates which comprises digesting an iron-bearing titaniferous material with sufficient hydrofluoric acid in an aqueous medium to form a titanium fluoride and iron fluoride-bearing solution, effecting reduction of ferric ions present in said solution to ferrous ions, separating the resulting solution from the insolubles, adding to the separated solution at a temperature of at least about 70° C. and in the presence of free hydrofluoric acid a salt of the group consisting of sodium, potassium and ammonium chlorides, and cooling the resulting solution to effect crystallization of the fluotitanate therefrom.

8. The method according to claim 7 in which sulfuric acid is introduced at any stage therein prior to said crystallization stage, the sulfuric acid being added in amount equal to about 5 to 50% by weight of the hydrofluoric acid used in the digestion stage.

HENRY C. KAWECKI.
EDWIN J. BIELECKI.

No references cited.